(12) United States Patent
Takada et al.

(10) Patent No.: US 7,239,054 B2
(45) Date of Patent: Jul. 3, 2007

(54) METHOD OF FORMING A MICRO-ROTATING DEVICE, AND A MICRO-ROTATING DEVICE PRODUCED BY THE METHOD

(75) Inventors: Akio Takada, Singapore (SG); Ching Biing Yeo, Singapore (SG); Jianmin Miao, Singapore (SG)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 10/915,142

(22) Filed: Aug. 10, 2004

(65) Prior Publication Data

US 2005/0035671 A1    Feb. 17, 2005

(30) Foreign Application Priority Data

Aug. 12, 2003    (SG) ............................. 200304381

(51) Int. Cl.
*H02K 5/00* (2006.01)

(52) U.S. Cl. ................... 310/40 MM; 29/596
(58) Field of Classification Search ......... 310/40 MM, 310/90; 29/596

See application file for complete search history.

(56) References Cited

U.S. PATENT DOCUMENTS

| 5,189,323 A * | 2/1993 | Carr et al. ............ 310/40 MM |
| 5,252,881 A * | 10/1993 | Muller et al. ............... 310/309 |
| 5,955,818 A | 9/1999 | Bertin et al. |
| 6,657,339 B2 * | 12/2003 | Herndon et al. ............... 310/90 |
| 6,961,213 B2 * | 11/2005 | Ameen et al. ........... 360/99.08 |
| 2002/0096018 A1 | 7/2002 | Rodgers et al. |

* cited by examiner

*Primary Examiner*—Darren Schuberg
*Assistant Examiner*—Nguyen Hanh
(74) *Attorney, Agent, or Firm*—Frommer Lawrence & Haug LLP; William S. Frommer; Paul A. Levy (57) ABSTRACT

A micro-rotating device has a rotor 200 (of diameter not more than 1.5 cm), a shaft 202 threaded through the rotor 200, and a shaft holder 207 for holding the shaft. The shaft holders are formed by etching an Si substrate 501 to form multiple shaft receiving openings 508. The rotors and shafts too are formed from respective Si substrates 301, 401. The rotors 200 are located over the shaft holders 207, and the shafts threaded through the rotors 200 into the openings 509 and attached there by a wafer bonding process. Then the substrate 501 is partitioned to give individual motor elements. Protrusions 206 extend from the rotor in the direction towards the stator to space the rotor from the shaft holder.

8 Claims, 7 Drawing Sheets

METHOD OF FORMING A MICRO-ROTATING DEVICE, AND A MICRO-ROTATING DEVICE PRODUCED BY THE METHOD

FIELD OF THE INVENTION

The present invention relates to MEMS (micro-electro-mechanical systems) devices, and in particular to MEMS devices which are axial type electromagnetic motors. The application is related to Singapore patent application no. 200304382.5, having the same priority date as the present application.

BACKGROUND OF INVENTION

Motors are widely used as sources to actuate mechanical components. Unfortunately, most motors are quite big, as they have many parts which are produced by conventional machining and assembly techniques. For that reason, there has recently been much research to develop MEMS micro-rotating devices, that is mechanical devices having dimensions of sub millimeters (for example, in case of a motor, having a maximum diameter no more than say 15 millimeters). Examples of such micro-rotating devices include micro-pumps or motors. However, reducing the size of the motor by reducing the size of its parts increases the difficulty in handling them, and significantly increases production cost.

Figure 1:
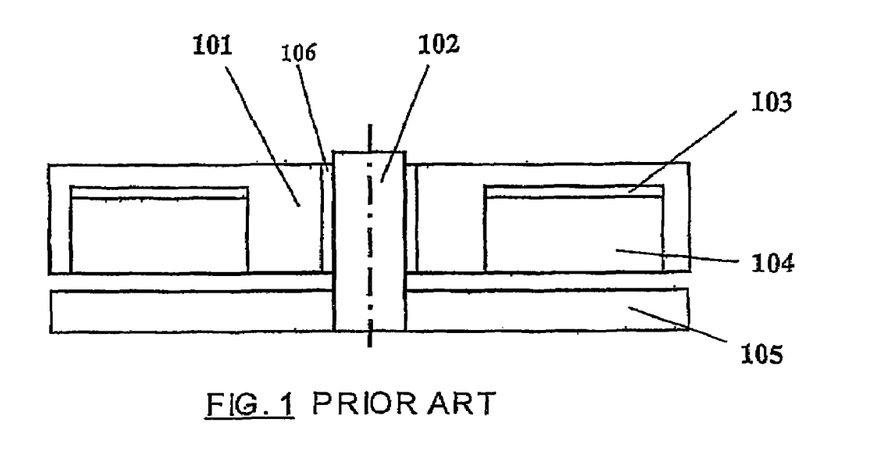
FIG. 1 is a cross-sectional view of a prior art micro-motor.

Known micro-rotating devices have a rotor element which includes a sleeve and which rotates around a spindle shaft threaded through the sleeve. A typical micro-rotating device is illustrated in cross-section in FIG. 1. It comprises a rotor (rotating disc) 101 and a stator 105. The stator 105 is formed with multiple coil windings (not shown). The spindle shaft 102 extends from the stator 105, and passes through a central aperture 106 in the rotor 101. The inner surface of the aperture 106 constitutes the sleeve for the shaft 102. The rotor includes a trench on its surface facing the stator 105. The trench encircles the aperture 106 and is filled with a permanent magnet 104 and a yoke 103. The rotor 101 rotates about the spindle shaft 102 when there is a continuous flow of electrical current into the coil windings on the stator 105. The micro-rotating device of FIG. 1 is constructed by placing the sleeve of the rotor disc 101 onto the shaft 102.

In contrast to conventional motors, the known MEMS micro-rotating device has a reduced the number of parts because these are fabricated from substrates such as Si and Glass. However, there are still several parts which are required to be put together in the assembly process. For example, it is necessary to combine the shaft with the rotor when a motor is assembled. It is difficult to establish reliable processes for such assembly, because size of each part is very small.

SUMMARY OF THE INVENTION

The present invention aims to provide a new and useful method for producing micro-rotating devices.

In general terms, the present invention proposes that multiple shaft receiving openings are formed on substrate, that shafts are inserted into the openings and attached there, and that the substrate is then partitioned to give individual motor elements.

Preferably, the rotor elements are attached before the substrate is partitioned. For example, during the process of inserting the shafts into the openings, the shafts may be threaded through the apertures in the rotor elements.

The rotor elements and/or shaft elements can also be formed within respective substrates.

Specifically, a first expression of the invention is a method for forming a plurality of micro-rotating devices, each having a shaft, a rotor having a central aperture for receiving the shaft, and a shaft holder, the method comprising the steps of forming a plurality of openings on a substrate to receive respective shafts, inserting respective shafts into the openings, and partitioning the substrate to form individual shaft holders.

Preferably the rotor is formed with protrusions from it extending in the direction towards the stator. In fact, a motor having such protrusions on the rotor constitutes a second, independent aspect of the invention. This aspect may be expressed as a micro-rotating device a rotor having a central aperture, a shaft threaded through the aperture, and a shaft holder holding one end of the shaft, the rotor being provided on a surface facing the shaft holder with protrusions extending in the direction of the shaft holder for maintaining a spacing between the surface of the rotor and the shaft holder.

BRIEF DESCRIPTION OF THE FIGURES

Preferred features of the invention will now be described, for the sake of illustration only, with reference to the following figures in which.

DETAILED DESCRIPTION OF THE EMBODIMENTS

Figure 2:
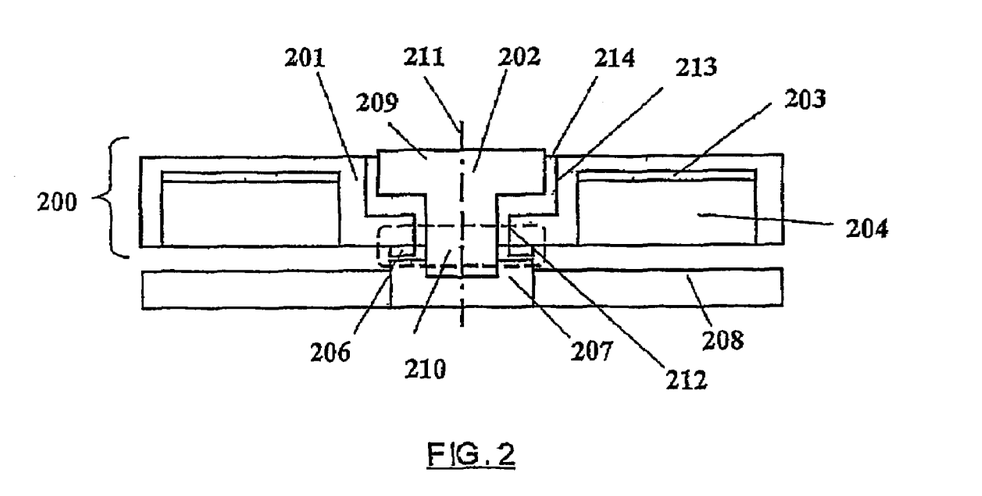
FIG. 2 is a cross-sectional view of a micro-motor which is an embodiment of the invention.

Referring to FIG. 2, a micro-rotating device which is an embodiment of the invention is shown in cross-section. The device includes a rotor 200 and stator 208. The rotor 200 includes a silicon body 201 having a central aperture 214. A shaft 202 projects from the stator 208, and the two are connected by a shaft holder element 207.

The shaft 202 is rotationally symmetric about an axis 211. The shaft includes a first portion 210 of uniform diameter at all positions along the axis 211, and a head portion 209 further from the stator 208 and which is of also of uniform diameter at all positions along the axis 211. The central aperture 214 of the rotor 200 is defined by a profile having a step, and thus including two cylindrical sleeve surfaces 212, 213. The cylindrical sleeve surface 212 is of smaller diameter than the cylindrical sleeve surface 213.

Of course, the figure is not to scale. Typically, the maximum diameter of the rotor device (in the sideways direction of FIG. 2) is at most 3 cm, and more preferably less than 2 cm, or less than 1.5 cm. The thickness of the rotor 200 is preferably in the range less than or equal to 600 µm.

The 'T'-shaped shaft 202 constitutes a means to avoid tilting of the rotor 200, and keeps the rotor 200 in position constantly throughout the rotation. Thus, the shaft 202 provides an advantage compared to the regular pin-type shaft 102 of FIG. 1.

As in shown FIG. 1, the silicon body 201 includes a trench in its surface which faces the stator 208, and the trench is substantially filled with a magnetic material 204 (e.g. an alloy) and a yoke layer 203. These materials induce a rotation motion when appropriate magnetic fields are generated by a coil (not shown) fixed to the stator 208.

Figure 9A:
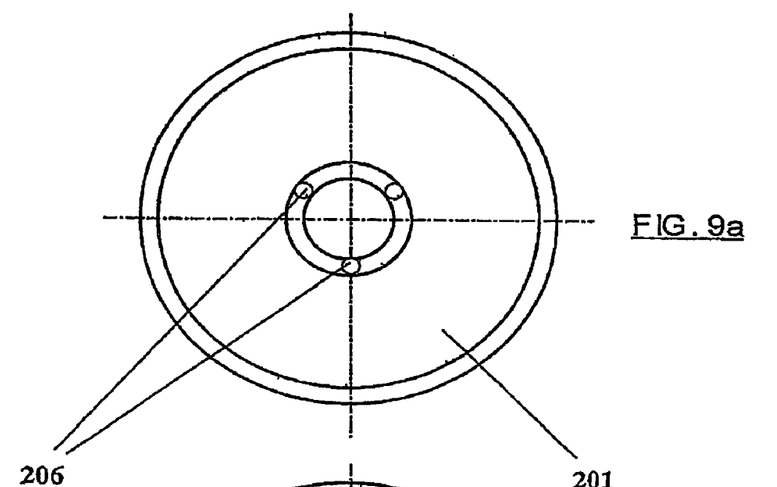
FIG. 9, which is composed of FIGS. 9(a) to 9(c), shows is a view of the lower surface of the rotor disk of FIG. 2(c) in several different variants of the protrusions within the scope of the invention.
Figure 9B:
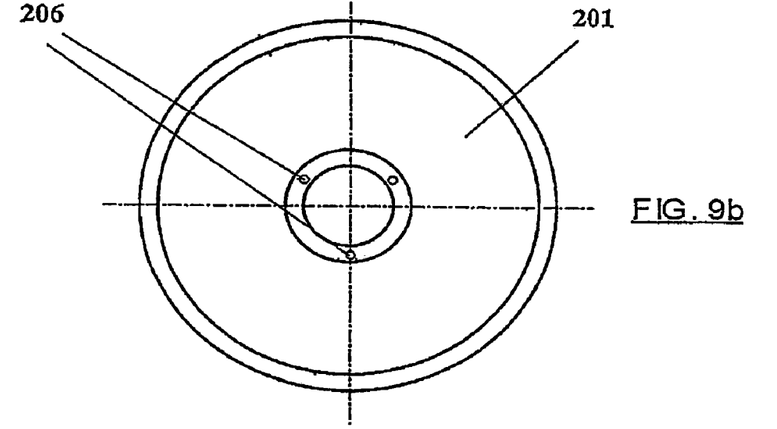
Figure 9C:
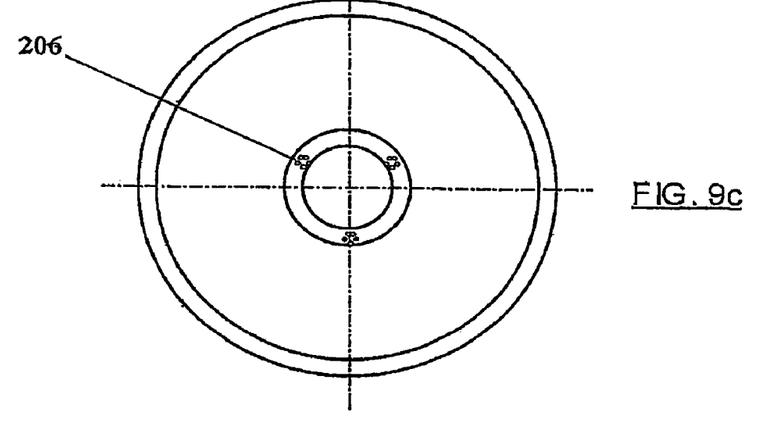

As a means to enhance the driving mechanism, small protrusions 206 are formed on the surface of the rotor disk 201 facing the stator. Possible configurations for the protrusions are illustrated in FIG. 9(a) to 9(c). The protrusions 206 are intended to minimize the contact resistance in the spinning motion by creating a separation between the rotor and the stator. Preferably multiple, round protrusions 206 are provided, symmetrically spaced around the aperture 214 at the bottom surface of the rotor disc 201, to help stabilize the spin motion at the contact interface. As shown in FIG. 9(c), the protrusions may be in groups. An etching process is preferred for forming the protrusions 206, since this can achieve the required specifications without imposing other defects on the disc 201 since the Si material is relatively hard.

To reduce the total thickness of the motor assembly, the thin rotor structure 200 is fabricated using a semiconductor process to selectively create the required profile, and to accurately control the required geometry of the intended rotor 200. Furthermore, the process allows an array of multiple rotor discs 201 to be made on single substrate concurrently, thereby cutting down on the construction cost and time. In this regard, micro-fabrication techniques, such as plasma etching, are used for producing the step profile, of micrometers in height, on the disc 201, which is not attainable from conventional machining technology.

Figure 3:
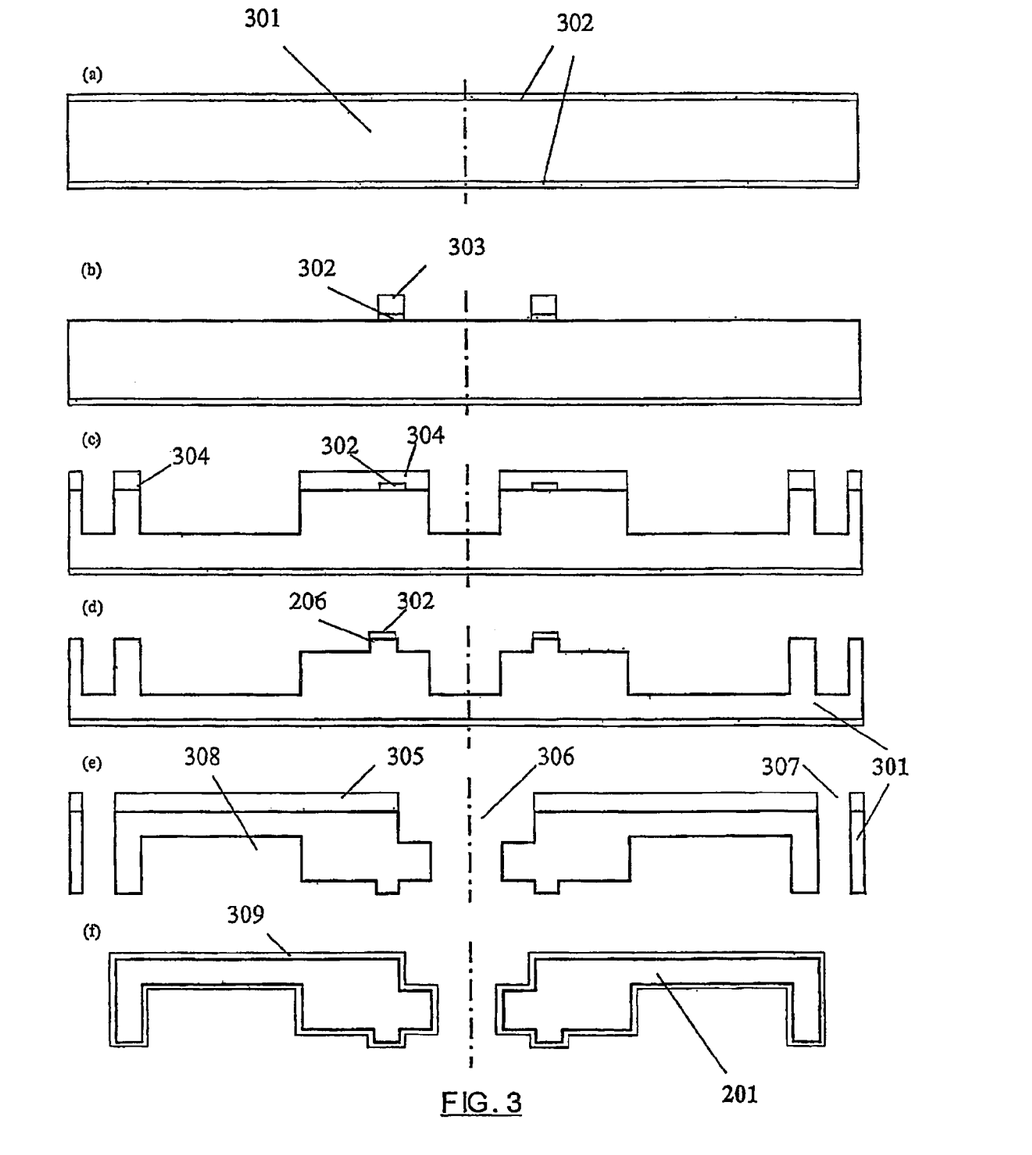
FIG. 3, which is composed of FIGS. 3(a) to 3(f), is cross-sectional views of a procedure for fabricating the rotor disc of the micro-motor of FIG. 2.

The details for the etching sequence in the fabrication of the Si disc 201 will be explained as follows, with reference to FIG. 3.

As shown in FIG. 3(a), a thin piece of double-side polished Si substrate 301 is first loaded into a furnace of high thermal heat to develop thin Silicon oxide ($SiO_2$) layer 302 on both its surfaces. This oxide layer functions as a protective mask in later steps of the method in cases when the surface is not coated with another protective material such as spin-coated photo resist. Considering the etching depth requirements, the thickness of $SiO_2$ layer 302 used is about 2 µm which is sufficient to stop the etching for a low-depth structure.

Next, the Si wafer is spin-coated on one side with a photo-resist masking layer 303 of about 7 µm thickness of on one side above the $SiO_2$ layer 302, and the layer 303 is subsequently patterned with the required profile by means of conventional lithography. Chemical plasma etching (using $CF_4$ and oxygen plasma) is then carried out, removing the unwanted portion of the $SiO_2$ layer 302, as shown in FIG. 3(b), A further photo-resist masking layer 304 is applied to the same surface of the water 301, covering the remaining portions of the 2 µm oxide layer. The layer 304 is patterned, and then chemical etching is again performed, as illustrated in FIG. 3(c), to create another profile for succeeding etching steps.

Owing to the fact that ions travel straight towards the substrate during the plasma etching process, deep perpendicular walls can be formed subsequently, with polymer passivation, as in the Bosch process, that shields the walls from the bombarding ions. In the most etched portions of the Si substrate 301 about one-third of the total thickness remains, as shown in FIG. 3(c).

Following that, the residual photo-resist layer is removed using chemical solvent, such as dipping in acetone. A further DRIE (deep reactive ion etching) plasma etching is carried out to take out about 20 µm from areas of the Si body 301 not covered by the remaining $SiO_2$ 302. This forms a set of uniformly distributed protrusions 206 dedicated for the air-bearing function, illustrated in FIG. 3(d). Subsequently, the $SiO_2$ left behind is removed by dipping the Si body 301 in Hydrofluoric (HF) acid.

Following that, the Si body 301 is inverted. Etching methods are again employed using another patterned masking layer 305 to make through-holes 306, 307 through the Si substrate 201 as shown in FIG. 3(f) and FIG. 3(g), in line with those earlier made cavities. Through hole 306 becomes the aperture of the disk 201, and through holes 307 singulate individual disks 201 from the substrate 301. To ensure that the etching of the holes 306, 307 is aligned on both sides of the substrate 201, an optical aligning system is used, along with the appropriate markings, to position the Si substrate when it is inverted in the etching chamber.

The photo-resist layer 305 is also used to reduce the thickness of the substrate 301 in the region around the central aperture 306 before the discs 201 are detached from the wafer substrate 301. The dimension of the sleeve on the rotor disc 201 has a stepped profile, intended to accommodate the different dimensions of the T-shaped shaft 202 as mentioned earlier.

At this point, the fabrication of the rotor disc 201 is completed. It has a shape of a flat round plate, with a through hole 306 at the centre. One side of the disc has a large, circular trench removed, used in the later assembly process. When each of the rotor discs 201 is detached from the substrate, it carries a residual layer of polymer resulting from the Bosch polymer passivation during the etching. It is then desirable to remove this thin coat entirely from the surface by dipping into ultra-sonic mixture bath containing Hydrosulfuric acid ($H_2SO_4$).

For further improvement to reduce friction, an addition thin layer of conforming coating film 309 is deposited on all surfaces of the disc 201, including the sleeve hole 306 on the etched disc 201. The thin layer 205, which is preferably Diamond-Like-Carbon (DLC) film, provides a lubricating effect due to its high hardness material property. One possible deposition technique comprises sputtering or chemical vaporization as well as, in this proposal, Filtered Cathodic Vapor Arc (FCVA) methods where low-temperature conformal film can be achieved with uncomplicated control for the required film thickness.

Figure 4:
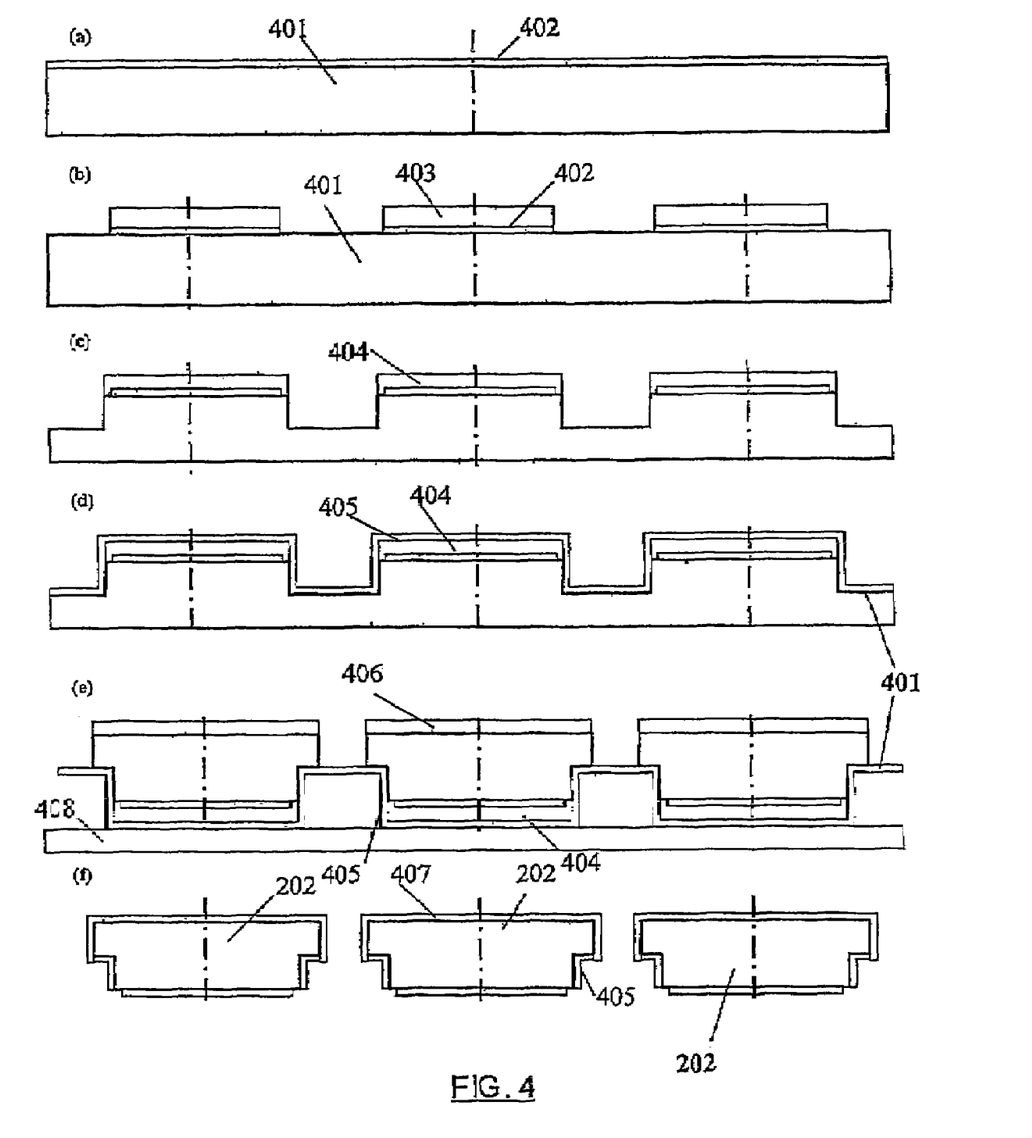
FIG. 4, which is composed of FIGS. 4(a) to 4f), is a cross-sectional views of a procedure for fabricating the shaft of the micro-motor of FIG. 2.

Turning to FIG. 4, the process is shown for fabricating multiple shafts on a single substrate. The intended material for shaft is Si, which has good rigidity and hardness characteristics. As shown in FIG. 4(a), a Si wafer 401 similar to wafer 301 of FIG. 3(a) is first spin-coated with approximately 2 mm of Cytop polymer adhesive 402. The polymer 402 is patterned into the required profile by lithography, and then RIE etching performed using a photoresist mask 403, as shown in FIG. 4(b). The polymer adhesive 402 offers the advantages of low temperature bonding and chemical resistance characteristics.

Subsequently, by conducting DRIE plasma etching using a patterned photo-resist mark 404, a portion of the intended shaft is formed as shown in FIG. 4(c). Without removing the photo-resist 404 left from the etching, the substrate is coated with DLC film 405, as shown in FIG. 4(d), using the deposition technique described earlier on all surfaces for reducing friction resistance. Following that, the substrate 408 is inverted and secured onto a new Si substrate 208 by a layer of photo-resist. A photoresist mask layer 406 is deposited for further etching, as shown in FIG. 4(e). Then the photo-resist 406 is removed, and the shafts 202 are singulated by removing the portions of the DLC 405 between them. Subsequently a DLC film 407 is deposited onto the top surface of the shaft 202, and the parts of sides of the shaft 202 which are not already covered by the DLC 405. Then the structure is removed from the support substrate 408. The resist 404 is removed (carrying away the portion of the layer 405 on it) to complete the fabrication of the shaft, as indicated in FIG. 4(f).

Figure 5:
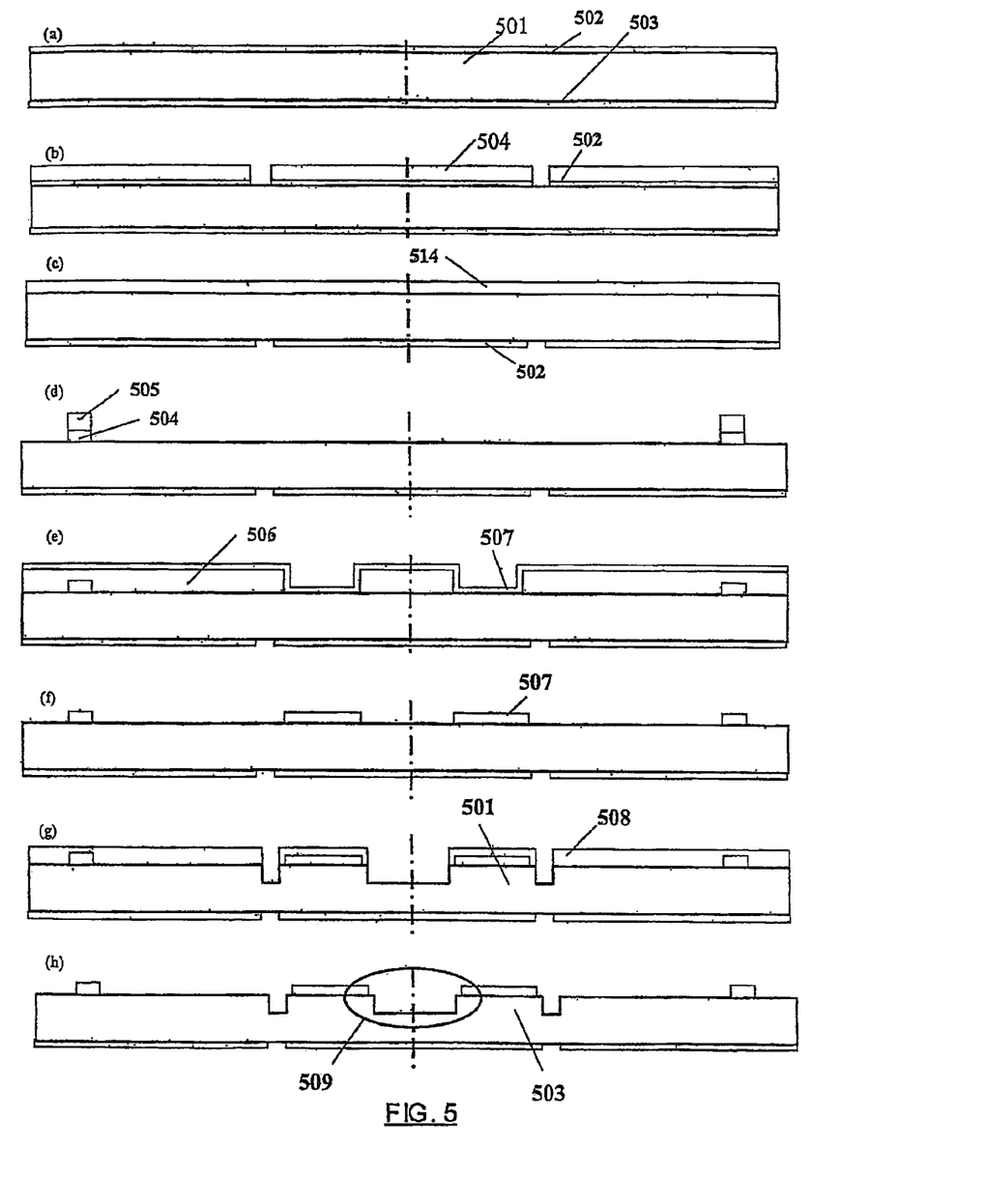
FIG. 5, which is composed of FIGS. 5(a) to 5(h), is cross-sectional views of a procedure for fabricating the shaft holder of the micro-motor of FIG. 2.
Figure 6:
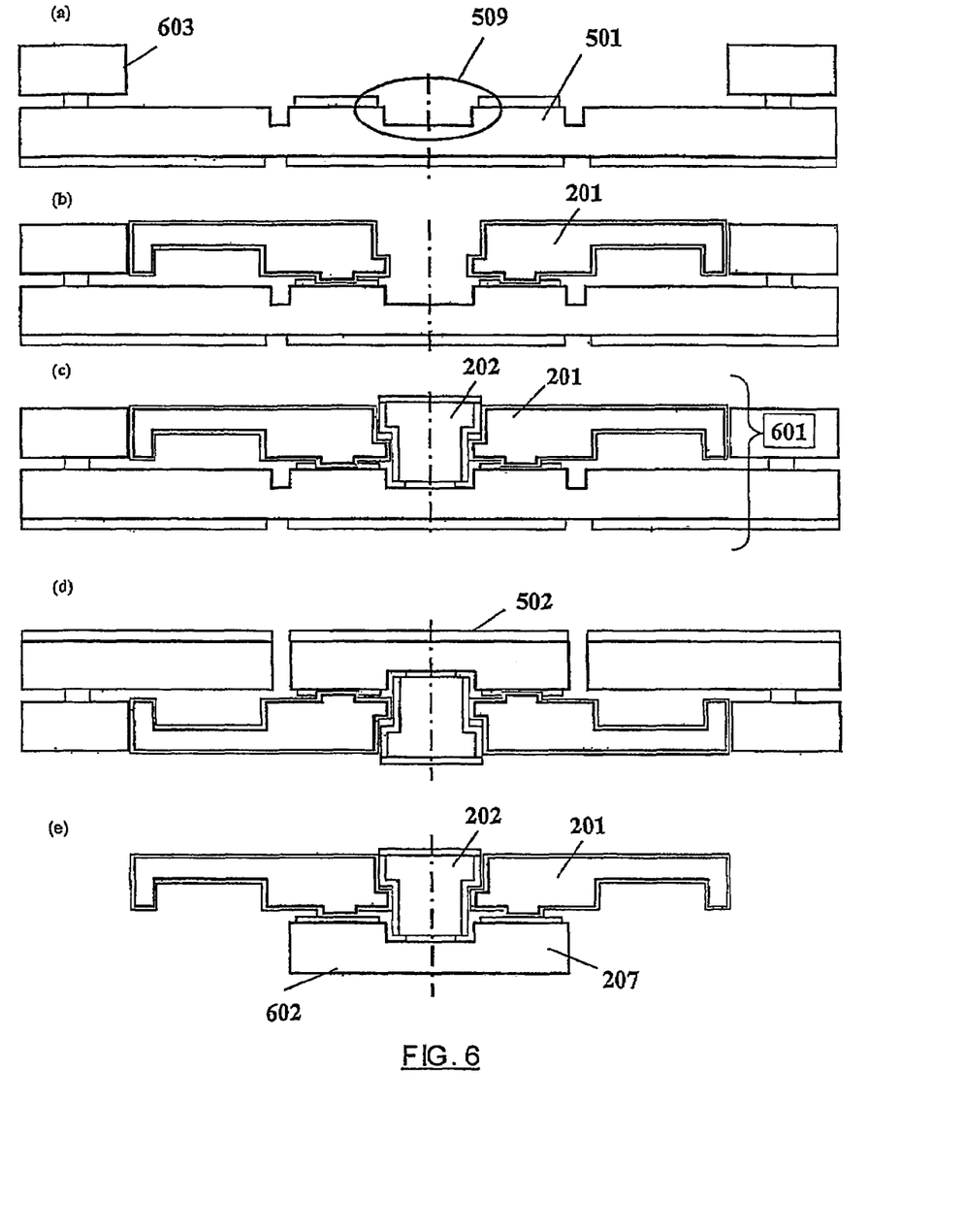
FIG. 6, which is composed of FIGS. 6(a) to 6(e), is cross-sectional views of the assembly procedure for the micro-motor of FIG. 2.

Turning to FIG. 5, the fabrication process for the shaft holder 207 is shown. It too employs an Si wafer 501. Oxide layers 502, 503 are formed on each of its surfaces in a thermal oxidation step, as shown in FIG. 5(a). A thin mask 504 is formed by lithographic patterning, and RIE etching is carried out on one side of the substrate, as shown in FIG. 5(b). Subsequently, the $SiO_2$ layer 503 is removed, the substrate 501 is inverted, and is spin coated with approximately 2 mm of Cytop polymer adhesive 514 on the reverse surface, and unwanted portions of the polymer adhesive 514 are etched off using a patterned masking layer 505. A photoresist layer 506 is deposited on selected parts of the upper surface of the substrate 501, and a DLC film 507 is also coated using FCVA as discussed above on the upper surface of the substrate, which is the intended surface of the rotor contact area as shown in FIG. 5(e). The layer 506 is lifted off, lifting off the portions of the DLC film 507 above it, as shown in FIG. 5(f). Another patterned photo-resist mask 508 is then deposited, and RIE etching of the Si substrate carried out, to create cavities 509, as shown in FIG. 5(g). Then the photo-resist 508 is removed, as shown in FIG. 5(h). The cavities 509 are helpful for an alignment process described below. The motor bonding process is illustrated in FIG. 6. In this process the alignment of the rotor to the stator is crucial. In a first step, shown in FIG. 6(a), the substrate 501 containing the shaft holder is aligned and adhered, by polymer adhesive, to the detached rotor discs 201 obtained earlier, as shown in FIG. 6(b). In this process it is helpful to use as guide elements the portions 603 of the substrate 301 (shown in FIG. 3) which were left after the rotors 201 were removed from it. The aperture 214 of each rotor disc 201 is used as a guide for inserting the respective shaft 202 downwardly into the cavity 509 in the shaft holder 207 which is still not detached from the rest of the substrate 501, as shown in FIG. 6(c). Then, the assembly 601 is heated in a chamber to a temperature of at least approximately 160° C. for at least 30 minutes, to bond the shaft 202 permanently to the shaft holder 207. Note that all assemblies 601 on the substrate 501 have the same structures and intended dimensions. Subsequently, the substrate set 501 is inverted, and the substrate 501 is etched through, using the previously made $SiO_2$ mask layer 502, to detach each micro-motor assembly from the substrate 501, as shown in FIG. 6(d). This etching creates a cylindrical base a few hundreds of micrometer thickness that functions as a support base 602 for securing the shaft 202 which detains the rotor disc 201 during rotation.

Figure 7:
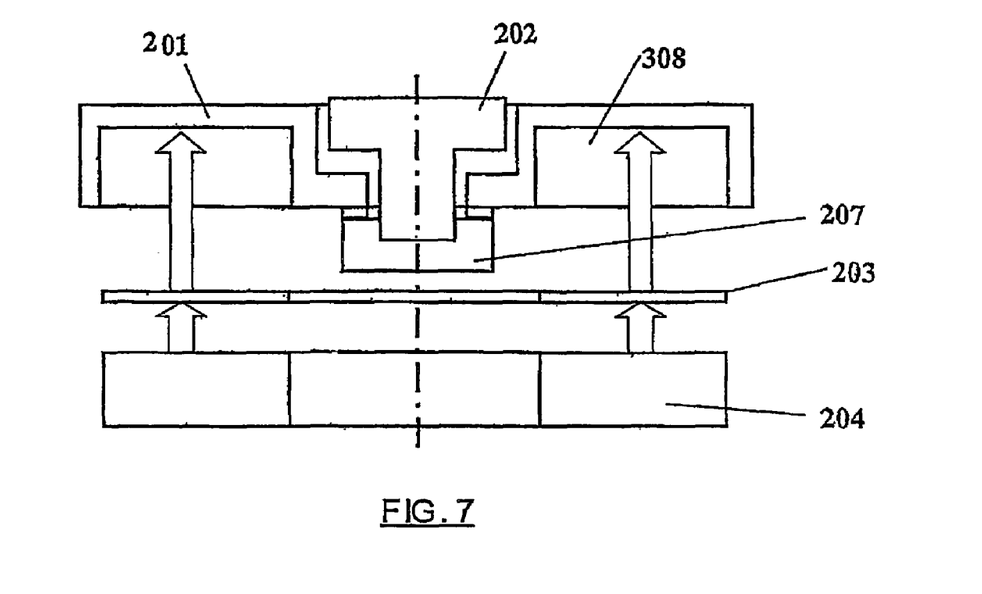
FIG. 7 is a cross-sectional view of the procedure for assembling the yoke and magnet of the rotor of FIG. 2 into the disks produced by the procedure of FIG. 3.

As shown in FIG. 7, a ring-shaped yoke plate 203 with high magnetic saturation property, for instance Nickel-iron (Ni—Fe), of about 100 mm thickness is added to the inner surface of the etched trench 308 on the rotor disc 201, by adhesive, to intensify the induced electromagnetic force. A ring-shaped bond magnet 204 hundreds of micrometers thick and composed of a magnetic alloy, such as Samarium-Cobalt (Sm—Co), is inserted over the yoke 203. The thickness of each of the magnet 204 and yoke 203 is appropriately controlled during the fabrication to ensure that they fit entirely into the etched hollow trench 308 on the disc 201, with good flatness at the base surface.

Figure 8:
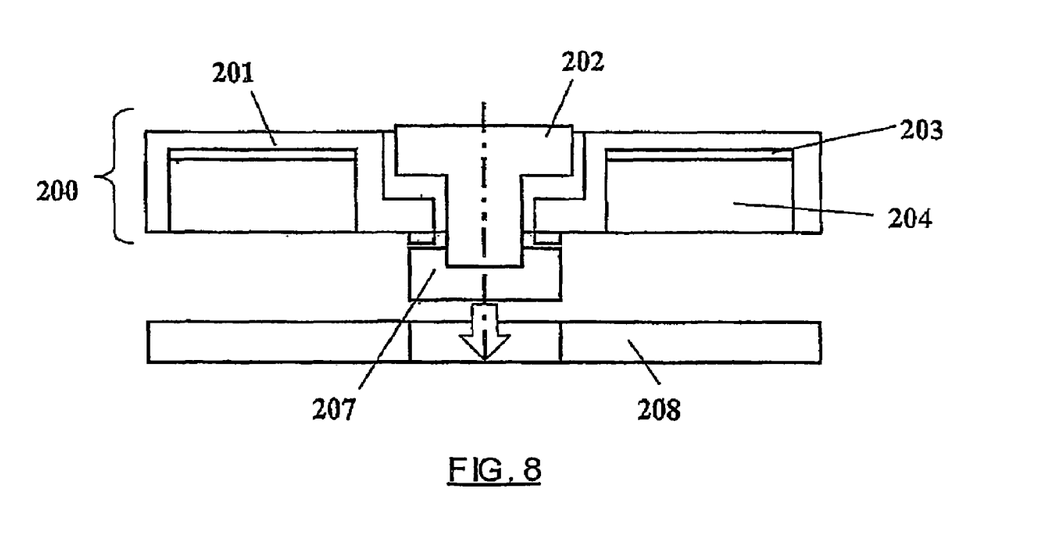
FIG. 8 is a cross-sectional view of the process for assembling for the stator of the micro-rotor of FIG. 2.

The assembly of micro-motor is completed by the insertion of the micro-motor assembly fully into the stator 208, as shown in FIG. 8. This can be done by hand, without the use of optical alignment tool. The stator 208 may consist of a thin Printed Circuit Board (PCB). It has a thickness slightly less than that of the shaft holder 207, and contains plated copper coil windings, which generate electrical fields to induce the electromagnetic torque needed for the rotation. A uniform thickness is maintained throughout the coils' area to keep a consistent air gap between the rotor 200 and the PCB 208 during the rotation. A check is performed that the shaft 202 is perpendicular to the rotor 200 and stator 208, and that the rotor 200 is parallel to the stator 208, to ensure steady rotating behaviour.

The invention claimed is:

1. A micro-rotating device comprising:
a rotor having a central aperture,
a shaft threaded through the aperture, and
a shaft holder for holding one end of the shaft, the rotor provided on a surface facing the shaft holder with protrusions extending in the direction of the shaft holder for maintaining a spacing between the surface of the rotor and the shaft holder to reduce frictional resistance between the rotor and the shaft holder,
wherein the shaft has a non-uniform diameter, having a first portion closer to the shaft holder of relatively smaller diameter and a second portion further from the shaft holder of relatively larger diameter, the central aperture having a profile shaped for contacting the shaft in both portions, and
wherein the shaft is formed from a substrate by an etching process.

2. A device according to claim 1 further comprising a protective coating layer formed on any one or more of the rotors, shafts and shaft holders.

3. A device according to claim 2 in which the protective coating layer is DLC (diamond-like-carbon).

4. A device according to claim 1 in which the rotor has a diameter of no more than 1.5 cm.

5. A method of making a micro-rotating device comprising:
forming a central aperture in a rotor;
threading a shaft through the central aperture;
etching a shaft holder in a substrate to hold an end of the shaft; and forming protrusions on a surfaces of the rotor extending toward the shaft holder to maintain a space between the surface of the rotor and the substrate, wherein a first portion of the shaft is closer to the shaft holder and has a smaller diameter than a second portion of the shaft further from the shaft holder, wherein the central aperture has a profile shaped for contacting the shaft in both the first and second portions.

6. A micro-rotating device comprising:

a rotor having a central aperture;

a shaft threaded through the central aperture;

a stator having a shaft holder for holding an end of the shaft; and protrusions on a surface of the rotor extending in the direction of the shaft holder for maintaining a spacing between the surface of the rotor and the shaft holder, wherein the first portion of the shaft is closer to the shaft holder and has a smaller diameter than a second portion of the shaft further from the shaft holder, and wherein the central aperture has a profile shaped for contacting the shaft in both the first and second portions.

7. The micro-rotating device of claim 6, wherein the profile of the central aperture is shaped to contact the shaft on at least the outside diameter surfaces of both the first and second portions.

8. The micro-rotating device of claim 7, wherein a cavity is etched partially through the shaft holder to hold the end of the shaft.

* * * * *